(12) United States Patent
Sheffler

(10) Patent No.: US 7,125,205 B2
(45) Date of Patent: Oct. 24, 2006

(54) CUTTING TOOL FOR ROUGH AND FINISH MILLING

(75) Inventor: Glenn W. Sheffler, Blairsville, PA (US)

(73) Assignee: Kennametal Inc., Latrobe, PA (US)

(*) Notice: Subject to any disclaimer, the term of this patent is extended or adjusted under 35 U.S.C. 154(b) by 415 days.

(21) Appl. No.: 10/234,220

(22) Filed: Sep. 4, 2002

(65) Prior Publication Data

US 2004/0042858 A1    Mar. 4, 2004

(51) Int. Cl.
    *B23C 5/00*  (2006.01)
(52) U.S. Cl. ............................. 407/11; 407/32; 407/34
(58) Field of Classification Search ............... 407/11, 407/32, 34, 51, 61; 451/461, 527
    See application file for complete search history.

(56) References Cited

U.S. PATENT DOCUMENTS

| | | | |
|---|---|---|---|
| 404,940 A * | 6/1889 | Whitney | 407/36 |
| 479,332 A | 7/1892 | Patten | |
| 1,284,092 A * | 11/1918 | Gray | 144/38 |
| 1,643,474 A | 9/1927 | Simmons | |
| 3,972,161 A * | 8/1976 | Zoiss | 451/541 |
| 4,018,576 A | 4/1977 | Lowder et al. | 51/309 R |
| 4,675,975 A * | 6/1987 | Kucharczyk et al. | 29/566 |
| 4,728,228 A | 3/1988 | Okunishi et al. | 407/35 |
| 4,789,273 A * | 12/1988 | Wiacek et al. | 407/34 |
| 4,993,891 A | 2/1991 | Kaminiski et al. | |
| 5,492,771 A | 2/1996 | Lowder et al. | 428/565 |
| 5,511,718 A | 4/1996 | Lowder et al. | 228/103 |
| 5,667,428 A * | 9/1997 | Lunn | 451/70 |
| 5,711,642 A | 1/1998 | Ball et al. | 409/234 |
| 5,951,378 A | 9/1999 | Miller et al. | |
| 5,993,297 A | 11/1999 | Hyatt et al. | 451/53 |
| 6,081,980 A * | 7/2000 | Lunn | 29/50 |
| 6,224,473 B1 * | 5/2001 | Miller et al. | 451/461 |
| 6,375,692 B1 | 4/2002 | Manwiller et al. | 51/302 |

FOREIGN PATENT DOCUMENTS

| | | |
|---|---|---|
| DE | 487142 | 11/1929 |
| FR | 76826 | 2/1918 |
| FR | 661531 | 7/1929 |
| FR | 36222 | 4/1930 |
| JP | 52-60986 | 8/1977 |
| JP | 2001-198719 | 7/2001 |

OTHER PUBLICATIONS

"Connecting Rod Production Reinvented," Shop Solutions Case Histories of Manufacturing Problem Solving, Manufacturing Engineering, Dec. 2002, pp. 47 and 48.

* cited by examiner

*Primary Examiner*—Willmon Fridie, Jr.
(74) *Attorney, Agent, or Firm*—Larry R. Meenan

(57) ABSTRACT

A milling cutter comprises a cutter body having two concentric annular rings. An outer ring is provided for rough milling and includes a plurality of cutting inserts equally spaced about the periphery of a cutter body. An inner finish ring comprises a ring member having a coating of abrasive material. As a result, a workpiece can be milled by a single milling cutter with the rough cutting inserts and then the abrasive material.

20 Claims, 5 Drawing Sheets

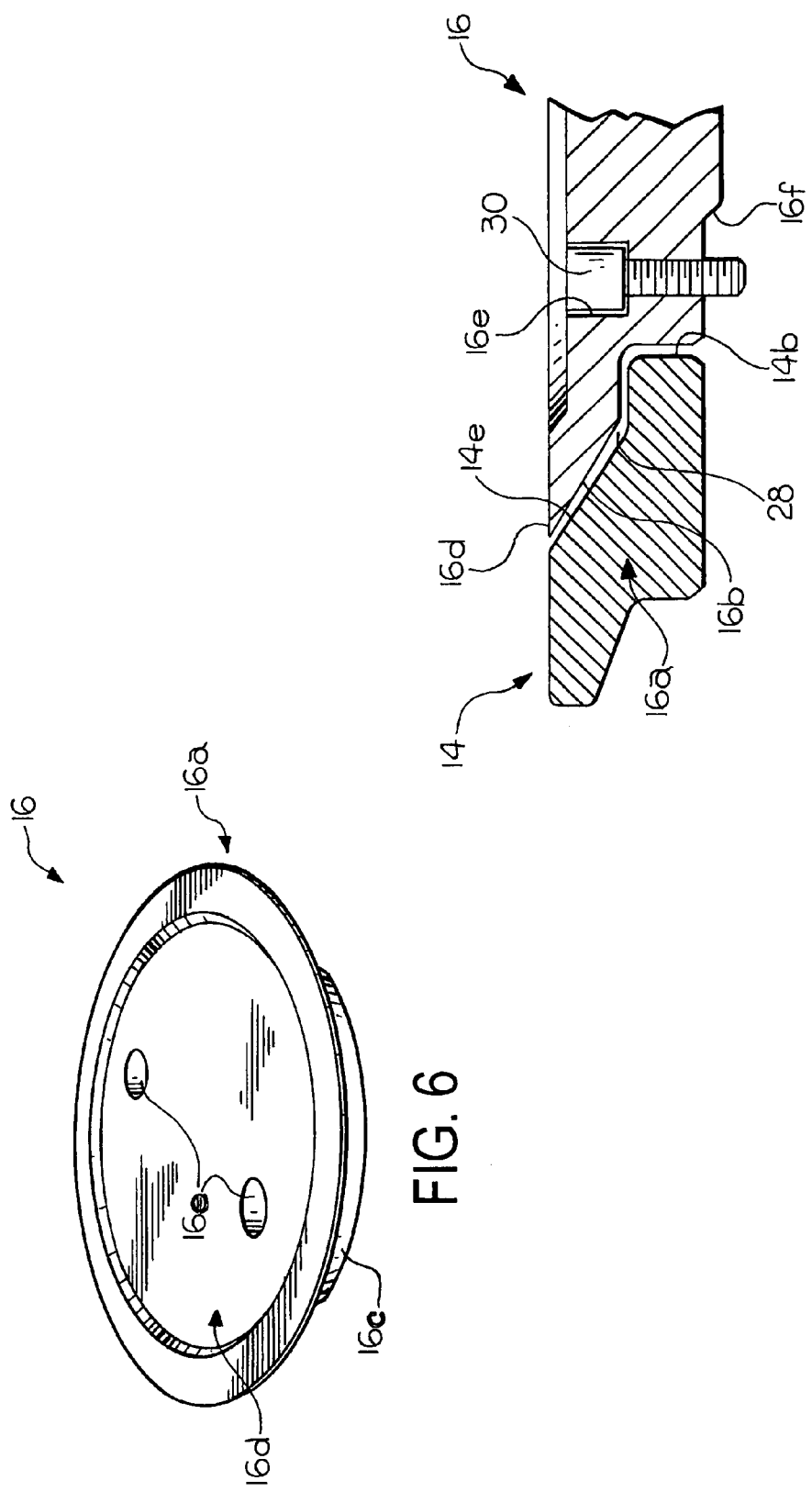

CUTTING TOOL FOR ROUGH AND FINISH MILLING

FIELD OF THE INVENTION

This invention generally relates to cutting tools and more particularly to a milling cutter for rough milling and finish milling in a single pass.

BACKGROUND OF THE INVENTION

Milling cutters for rough milling operations are well known. Such milling cutters typically comprise a cutter body, which is a generally circular shaped ring, having a plurality of pockets in an outer periphery thereof. A cutting insert is secured in each pocket. Each cutting insert comprises a body and at least one cutting edge. The body is secured directly in the pocket or to a cartridge, which is secured in the pocket. Similar milling cutters are known for finish milling operations. Such milling cutters have an abrasive material thereon, instead of having cutting inserts secured thereto. For milling a workpiece, the two milling cutters are used successively. After milling the workpiece with a rough milling cutter, the rough milling cutter is replaced with the finish milling cutter. Replacing the rough milling cutter with the finish milling cutter is a burdensome, time-consuming task.

What is needed is a single milling tool that is capable of rough and finish milling during a single operation. Ideally, such a tool would include a cutter body having a plurality of cutting inserts releasably secured to an outer periphery thereof for rough milling purposes and an abrasive material, like diamond or cubic boron nitride (CBN), secured to a face thereof for finish milling purposes. By placing the abrasive material farther from the cutter body than the cutting inserts, rough and finish milling operations can be accomplished during a single milling operation.

SUMMARY OF THE INVENTION

Generally speaking, the invention is directed to a cutting tool that overcomes one or more shortcomings associated with the prior art. To this end, the cutting tool is in the form of a milling cutter comprising two concentric annular rings. An outer ring is provided for rough milling and includes a plurality of cutting inserts spaced about the periphery of a cutter body. An inner finishing ring comprises a ring member having an abrasive surface. As a result, a workpiece can be rough and finish milled with a single pass by a single milling cutter.

The inner finishing ring is designed for only abrasive material. This could be diamond, cubic boron nitride (CBN), or any other type of abrasive material. The inner finishing ring itself does not contain replaceable inserts. However, the inner finishing ring is removable and replaceable from the cutter body, thus adding flexibility to the milling cutter.

BRIEF DESCRIPTION OF THE DRAWINGS

FIG. 6 is a perspective view of a shower cap, which is illustrated in FIG. 1; and FIG. 7 is an enlarged partial sectional view of the finishing ring and the shower cap showing in detail mating surfaces therebetween.

DETAILED DESCRIPTION OF THE INVENTION

Figure 1:
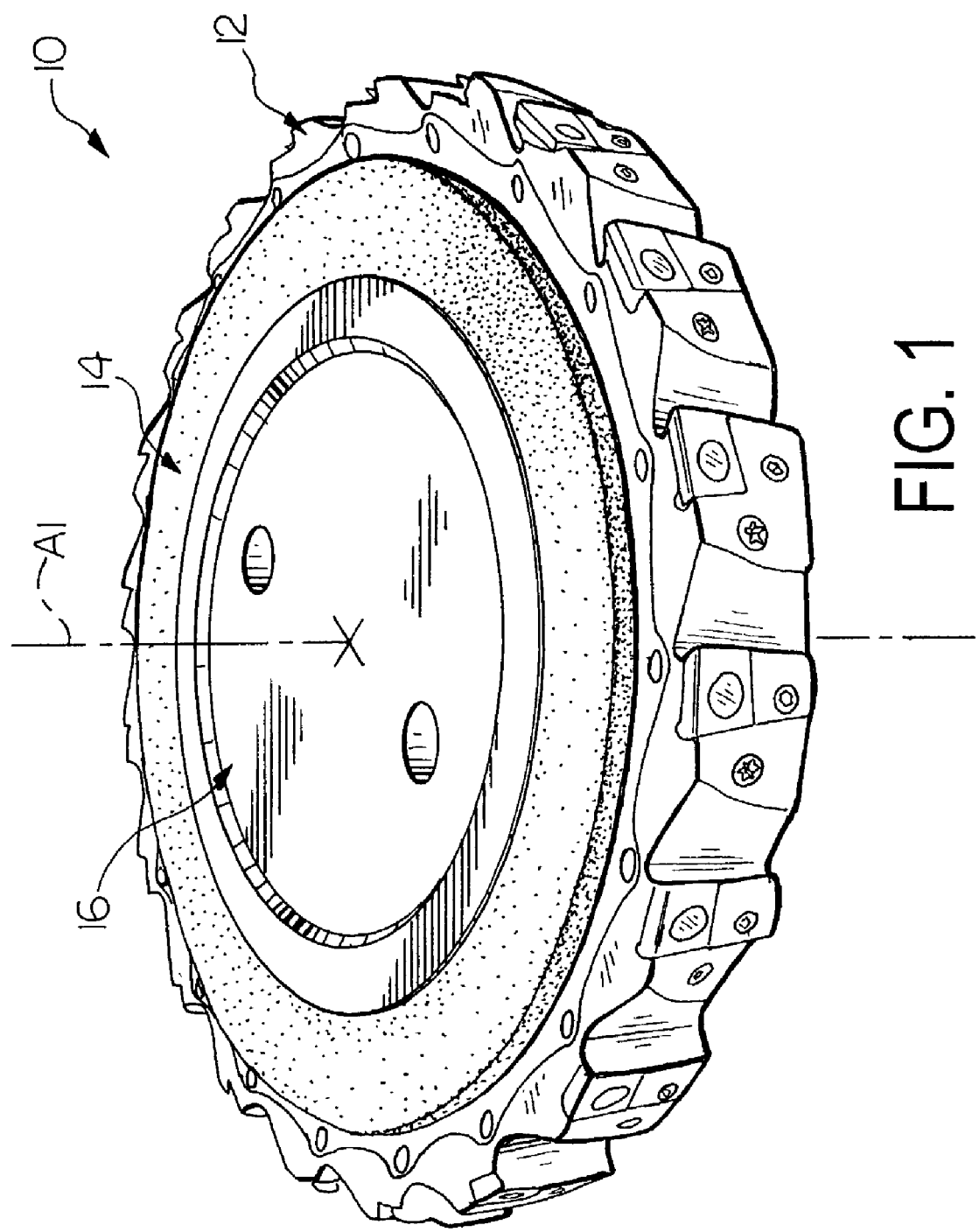
FIG. 1 is a perspective view of a cutting tool of the invention that includes a cutter body having adjustable insert cartridges and a removable finishing ring.

With reference now to FIG. 1, wherein like numerals designate like components throughout all of the several figures, there is illustrated a cutting tool according to a preferred embodiment of the invention. The cutting tool illustrated is in the form of a milling cutter 10 that functions to perform a rough milling operation and a finish milling operation in a single operation or pass. The milling cutter 10 is basically comprised of two concentric annular rings 12, 14. A first or outer ring, which is defined by a cutter body 12, is provided for the rough milling operations. A second or inner ring which is defined as a finishing ring 14, is provided for the finish milling operations. A shower cap 16 is provided at the center of the finishing ring 14 for directing coolant from a spindle (not shown) across the finishing ring 14 to clean the finishing ring 14 and flush chips produced from milling a workpiece away from the center of the milling cutter 10.

Figure 2:
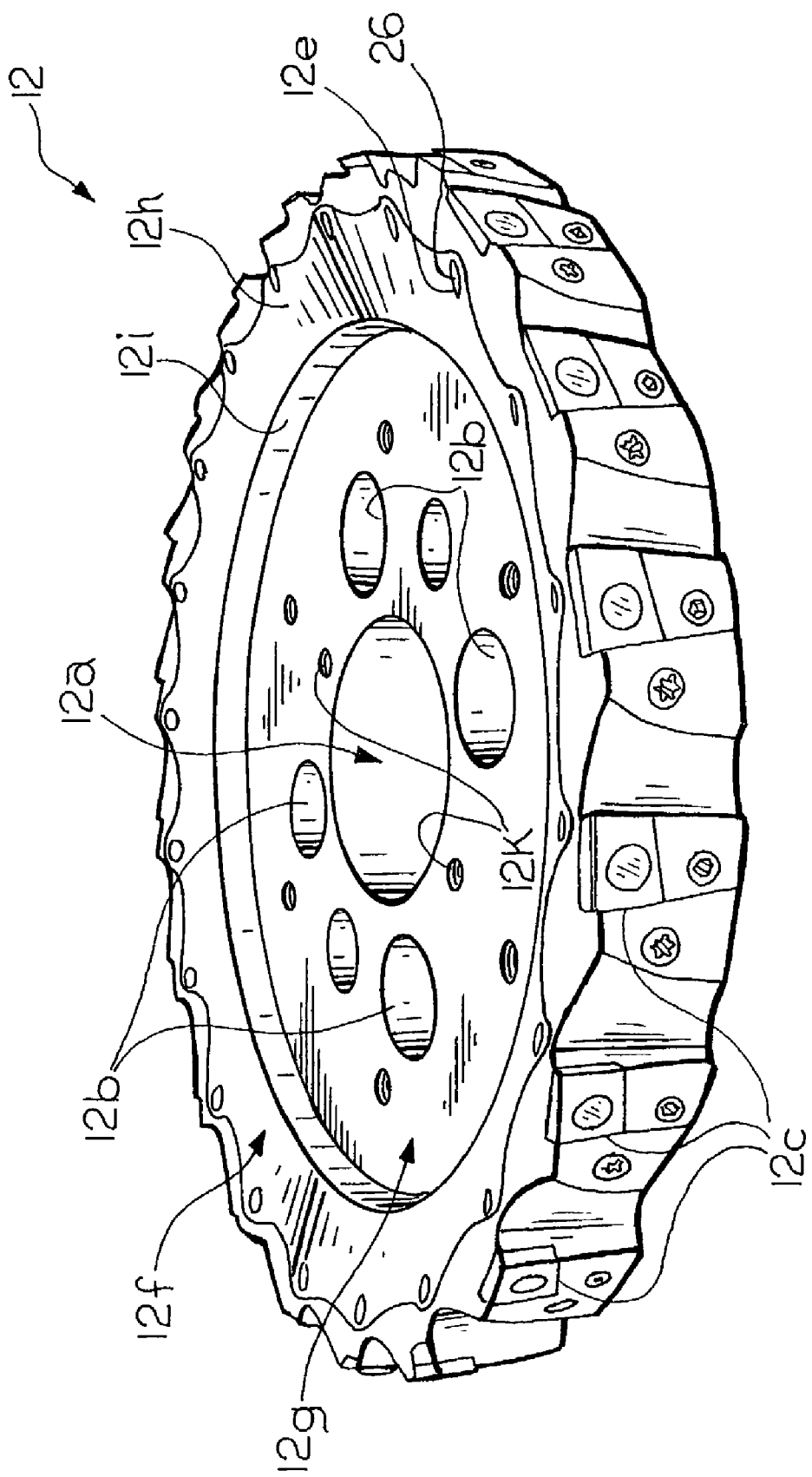
FIG. 2 is a perspective view of the cutter body illustrated in FIG. 1.

As illustrated in FIG. 2, the cutter body 12 has a central large-diameter pilot hole 12a in which the end of the rotatable shaft, shaft adapter, or spindle of a milling machine (not shown) can he fitted. The pilot hole 12a is arranged about an axis Al of rotation of the milling cutter 10, which coincides with the axis of rotation of the milling machine to which the milling cutter 10 is mounted. The cutter body 12 also can have one or more (four in the illustrated embodiment) tapered bolt holes 12b, which are concentric to the axis Al and spaced at angular intervals around the central pilot hole 12a. The cutter body 12 can further be provided with a key or keyway (not shown) that mates with the spindle to assist in transmitting torque from the milling machine to the milling cutter 10.

The cutter body 12 also has a plurality of pockets 12c successively defined on the outer peripheral surface of the cutter body 12. Each of the pockets 12c is of a prescribed dimension.

Cutting inserts 18, for example, of high-speed steel, powder metal, carbides or ceramics, are held respectively within the pockets 12c successively without interruptions or gaps therebetween. Each cutting insert 18 is comprised of a body 18a and one or more cutting edges 18b. The cutting edges can be tipped, for example, with polycrystalline diamond (PCD), cubic boron nitrate (CBN), or some other material suitable for removing material from a workpiece. The cutting insert body I 8a also has a hole 18c in the radial direction of the cutter body 12.

The cutting inserts 18 are held in fixed relation to the pockets 12c. This can be accomplished in any suitable manner. For example, a clamp stud 20 extends through the hole 18c the cutting insert body 18a and further into a hole (not shown) in the cutter body 12. A clamp stud screw 22 is threaded into a threaded hole 12d in the cutter body 12 at an angle relative to the clamp stud 20 and into engagement with the clamp stud 20 to hold the clamp stud 20 and the cutting insert 18 in the pocket 12c.

Figure 3:
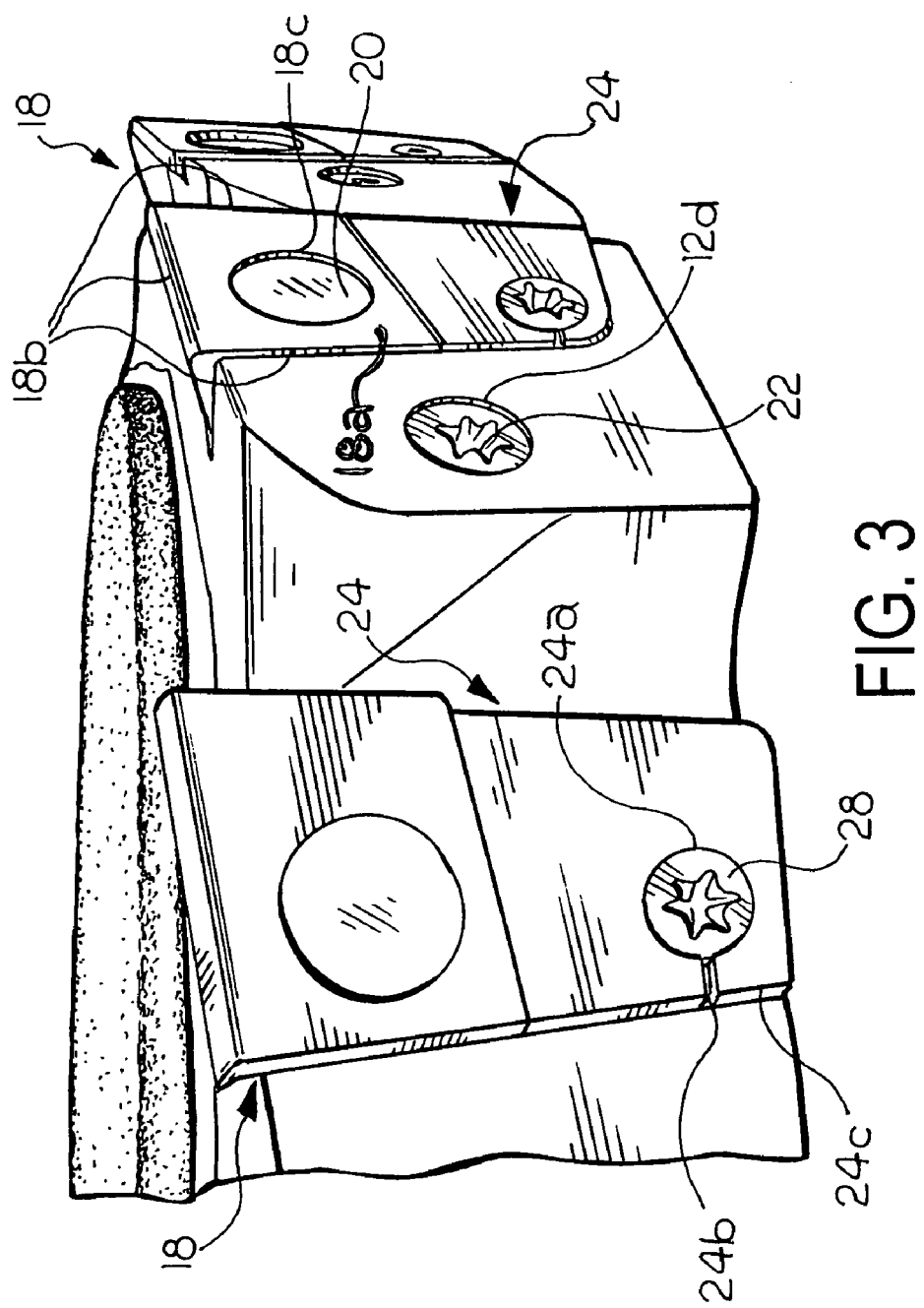
FIG. 3 is an enlarged partial cutaway view in perspective of the cutter body illustrated in FIGS. 1 and 2 showing in detail an adjustment element secured to the periphery of the cutter body.

The cutting inserts 18 are preferably adjustable relative to the cutter body 12. This can be accomplished in any suitable manner. For example, adjustment elements 24 can be supported about the periphery of the cutter body 22, as illustrated in FIG. 3. Each adjustment element 24 can be supported relative to the cutter body 12 by a retaining element 26 (illustrated in FIG. 2) that can be inserted in an axial direction relative to the cutter body 12 into a retaining element hole 12e in the cutter body 12 and further into a retaining element hole (not shown) in the adjustment element 24. The retaining element 26 functions to hold the adjustment element 24 in place against the centrifugal forces of milling cutter 10 when performing a milling operation.

The adjustment element 24 has a tapered hole 24a and a slot 24b extending from the tapered hole 24a to an edge 24c of the adjustment element 24. A tapered screw 28 is threaded into a portion (not shown) of the adjustment element 24. Upon tightening the tapered screw 28 into the tapered hole 24a, the slot 24b in the adjustment element 24 expands, moving the cutting insert 18 in an axial direction (upwardly when viewing FIG. 3).

Figure 4:
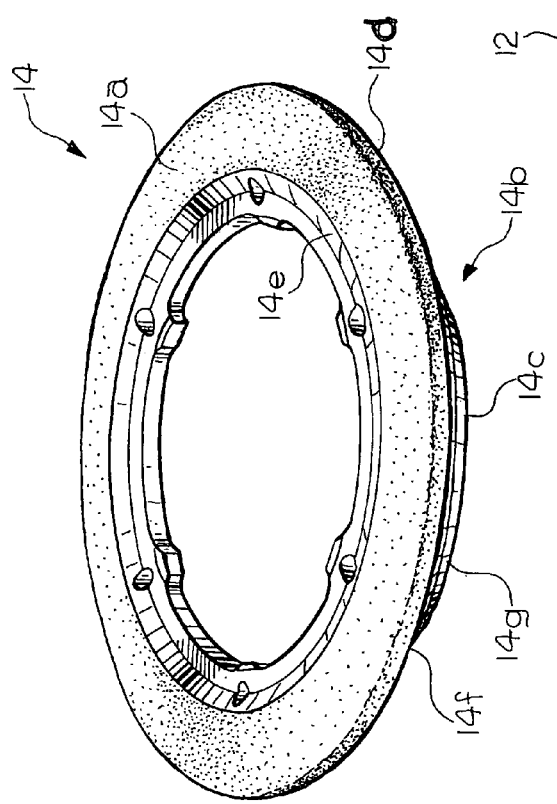
FIG. 4 is a perspective view of the finishing ring illustrated in FIG. 1.

As illustrated in FIG. 4, the finishing ring 14 is secured and centered on a first side or face 12f of the cutter body 12. The finishing ring 14 comprises at least one abrasive surface 14a, such as an abrasive surface made, for example, of aluminum oxide, polycrystalline diamond (PCD), cubic boron nitride (CBN), or other suitable abrasive material. The abrasive surface 14a is supported by a circular base portion 14b made, for example, of high-speed steel. The abrasive surface 14a and circular base portion 14b are preferably formed as a singular unit, such as by milling the base portion 14b from a solid piece of metal, or by casting the base portion 14b, and applying the abrasive surface 14a thereto.

Figure 5:
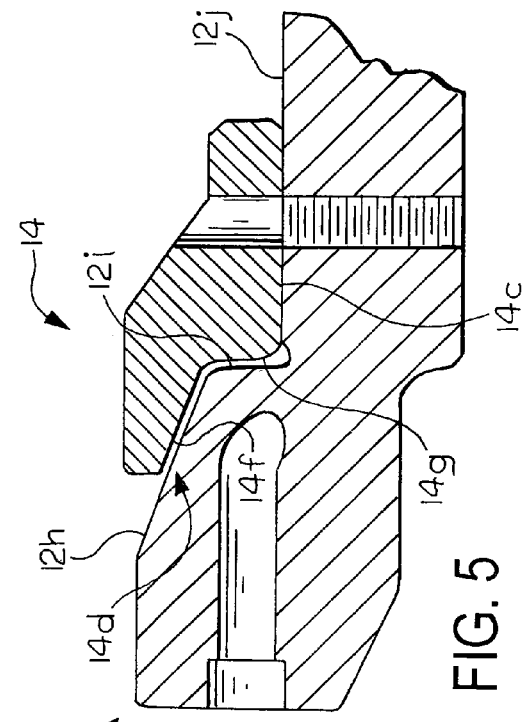
FIG. 5 is an enlarged partial sectional view of the cutter body and the finishing ring showing in detail mating surfaces therebetween.

The base portion 14b includes a base surface 14c, an outside ring surface 14d, and a tapered inside ring surface 14e. The base surface 14c is adapted to be oriented adjacent and is complementary to a recessed surface 12g in the face 12f of the cutter body 12. The outside ring surface 14d comprises a clearance surface 14f and a guide surface 14g. The clearance surface 14f is preferably tapered and dimensioned to be spaced from a tapered surface 12h on the face 12f of the cutter body 12, as illustrated in FIG. 5. The guide surface 14g forms a slip fit with a guide surface 12i, which defines in part the recessed surface 12f in the cutter body 12. The base surface 14c of the finishing ring 14 is drawn tightly upon a base surface 12j that defines another part of the recessed surface 12f in the cutter body 12.

As illustrated in FIGS. 6 and 7, the shower cap 16 is generally circular-shaped and preferably made of a non-tool steel, such as aluminum, so as to be light-weight. The shower cap 16 has an outside edge surface 16a defined by a tapered surface 16h portion and a generally cylindrical surface portion 16c. The tapered surface portion 1ab is adapted to be located in spaced relation to the tapered inside ring surface 14e of the finishing ring 14 (illustrated in FIG. 7). Similarly, the generally cylindrical surface portion 16c is adapted to be located in spaced relation to a generally cylindrical inside surface 14b of the finishing ring 14 (illustrated in FIG. 7). This spaced relationship forms a channel 28 through which fluid is directed from the spindle of a milling machine (not shown) to the abrasive surface 14a and the cutting inserts 18. As is clearly illustrated, the channel 28 is tapered to form a venturi with a high-pressure region at the face 16d of the shower cap 16 adjacent the abrasive surface 14a.

The shower cap 16 preferably has one or more counterbored bolt holes 16e. The bolt holes 16e are concentric to and spaced at angular intervals around the axis A1 of rotation of the milling cutter 10. The shower cap 16 is secured to the cutter body 12 by bolts 30 (illustrated in FIG. 7) the pass through the bolt holes 16e in the shower cap 16 and are threaded into threaded bolt holes 12k in the cutter body 12.

the shower cap 16 further has a circular inside wall surface 16f that extends beyond the base surface 14c of the finishing ring 14 into the pilot hole 12a of the cutter body 12 for locating the shower cap 16 relative to the spindle of the milling machine (not shown).

In operation, the cutter body 12 can be fixed to the spindle of a milling machine (not shown). This can be accomplished by inserting bolts (not shown) through respective holes 12b in the cutter body 12 and threading the bolts into bolt holes defined in a flange (not shown) that is integral with the spindle. As a result, the cutter body 12 and the spindle are firmly fastened together.

When the spindle is rotated at a high speed by a rotatable drive source (not shown), the cutter body 12 is rotated. As the milling cutter 10 traverses a workpiece (not shown), the cutting edges 18b of the inserts 18 mounted on the cutter body 12 cut the workpiece while the abrasive surface 14a of the finishing ring 14 finishes the workpiece.

The cutting edges 18b of the cutting inserts 18 may become worn or damaged, or may require replacement to meet a particular need. The cutting edges 18b can easily be changed simply by indexing the cutting insert to another cutting edge or by replacing the inserts 18 entirely.

The cutting inserts 18 can easily be moved and the position of the cutting edges 18b can easily be adjusted relative to the cutter body 12 simply by adjusting the position of the adjustment element 20.

The finishing ring 14 only functions to grind the workpiece. As stated above, the abrasive surface 14a can be polycrystalline diamond (PCD), cubic boron nitride (CBN), or any other type of finishing media. The preferred finishing ring 14 does not contain any type of replaceable insert. Instead, the entire finishing ring 14 itself is adapted to be removed from the cutter body 12 and thus is easily replaceable. This adds flexibility to the milling cutter 10 because the milling cutter 10 can be used without the finishing ring 14 and the shower cap 16 to perform only rough milling operations. This is a huge advantage over the prior art. If an operator wants to use the milling cutter 10 for roughing only, this too is possible by merely removing the finishing ring 14 and shower cap 16.

When the finishing ring 14 is used, the finishing ring 14 projects axially from the cutter body 12 slightly farther than do the cutting inserts 18. The milling cutter 10 performs both rough and finish milling during a single operation. By adjusting the position of the cutting inserts 18 axially relative to the cutter body 12, the amount of work performed by the finishing ring 14 is adjusted. As the axial distance between the cutting edges 18b of the cutting inserts 18 is increased, the amount of material removed from the workpiece by the finishing ring 14 is increased. It should be clearly understood by one of ordinary skill in the art of the invention that the finishing ring is intended to remove a minimal.

In a preferred embodiment of the invention, the milling cutter 10 is assembled by first securing the finishing ring 14 to the cutter body 12 and then securing the shower cap 16 to the cutter body 12. In order to remove the finishing ring 14 from the cutter body 12, the shower cap 16 must be removed from the cutter body 12 to access the screws (not shown) which secure the finishing ring 14 to the cutter body 12. Consequently, the screws remain protected from chips produced from a workpiece during a milling operation.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A milling cutter comprising:
    a cutter body having a periphery and at least one insert pocket about an outer radial circumference of the periphery;
    a cutting insert secured in the insert pocket; and
    a finish ring having a continuous abrasive surface thereon and being removably secured to the cutter body.

2. The milling cutter of claim 1, wherein the cutter body has a plurality of insert pockets about the periphery including the at least one insert pocket and a cutting insert is secured in each of the insert pockets.

3. The milling cutter of claim 1, wherein the finish ring is concentric with the periphery of the cutter body.

4. The milling cutter of claim 1, wherein the cutting insert performs a rough milling operation and the abrasive material performs a finish milling operation in a single operation.

5. The milling cutter of claim 1, wherein the cutting edge is tipped with a material suitable for removing material from a workpiece.

6. The milling cutter of claim 1, wherein the cutting insert is adjustable relative to the cutter body.

7. The milling cutter of claim 1, further comprising an adjustment element supported relative to the cutter body and adjustable in an axial direction relative to the cutter body to move the cutting insert in an axial direction relative to the cutter body.

8. A milling cutter comprising:
    a cutter body having a periphery and at least one insert pocket about the periphery;
    a cutting insert secured in the insert pocket;
    a finish ring having an abrasive surface thereon and being removably secured to the cutter body; and
    an adjustment element supported relative to the cutter body and adjustable in an axial direction relative to the cutter body to move the cutting insert in an axial direction relative to the cutter body, wherein the adjustment element has a tapered hole and a slot extending from the tapered hole to an edge of the adjustment element, the tapered screw being adapted to be tightened into the tapered hole to expand the slot and the adjustment element to move the cutting insert in an axial direction.

9. The milling cutter of claim 1, wherein the abrasive surface is an aluminum oxide surface.

10. The milling cutter of claim 1, wherein the abrasive surface is a polycrystalline diamond surface.

11. The milling cutter of claim 1, wherein the abrasive surface is a cubic boron nitride surface.

12. A milling cutter comprising:
    a cutter body having a periphery and at least one insert pocket about the periphery;
    a cutting insert secured in the insert pocket; and
    a finish ring having an abrasive surface thereon and being removably secured to the cutter body; and
    a shower cap adjacent the finishing ring for directing fluid across the finishing ring.

13. The milling cutter of claim 12, wherein the shower cap is made of a non-tool steel.

14. The milling cutter of claim 12, wherein the shower cap is made of aluminum.

15. The milling cutter of claim 12, wherein the shower cap has a tapered surface that is adapted to be located in spaced relation to a tapered inside ring surface of the finishing ring to form a channel therebetween through which fluid can be directed to the abrasive surface.

16. The milling cutter of claim 15, wherein the channel is tapered to form a venturi with a high-pressure region at a face of the shower cap adjacent the abrasive surface.

17. The milling cutter of claim 12, wherein the shower cap has a circular inside wall surface that extends beyond a base surface of the finishing ring into a pilot hole of the cutter body for locating the shower cap.

18. The milling cuter of claim 8, wherein the cutter body has a plurality of insert pockets about the periphery including the at least one insert pocket with a cutting insert secured in each of the insert pockets, each insert having an adjustment element.

19. The milling cutter of claim 8, wherein the finish ring is concentric with the periphery of the cutter body.

20. The milling cutter of claim 8, wherein the cutting insert performs a rough milling operation and the abrasive material performs a finish milling operation in a single operation.

\* \* \* \* \*